(12) United States Patent
Zibold et al.

(10) Patent No.: US 11,237,290 B2
(45) Date of Patent: Feb. 1, 2022

(54) METHOD FOR LOCATING, AND LOCATING DEVICE

(71) Applicant: Robert Bosch GmbH, Stuttgart (DE)

(72) Inventors: Tobias Zibold, Stuttgart (DE); Frank Huembert, Stuttgart (DE); Andrej Albrecht, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 39 days.

(21) Appl. No.: 16/624,371

(22) PCT Filed: Jun. 4, 2018

(86) PCT No.: PCT/EP2018/064567
§ 371 (c)(1),
(2) Date: Dec. 19, 2019

(87) PCT Pub. No.: WO2019/011526
PCT Pub. Date: Jan. 17, 2019

(65) Prior Publication Data
US 2021/0149072 A1    May 20, 2021

(30) Foreign Application Priority Data
Jul. 14, 2017 (DE) ...................... 10 2017 212 094.0

(51) Int. Cl.
*G01V 3/08* (2006.01)
*G01V 3/165* (2006.01)
*G01B 7/00* (2006.01)

(52) U.S. Cl.
CPC ............. *G01V 3/088* (2013.01); *G01B 7/003* (2013.01); *G01V 3/165* (2013.01)

(58) Field of Classification Search
CPC . G01V 3/06; G01V 3/08; G01V 3/081; G01V 3/088; G01V 3/15; G01V 3/165; G01B 7/003
See application file for complete search history.

(56) References Cited

U.S. PATENT DOCUMENTS 5,619,128 A    4/1997 Heger
6,023,159 A    2/2000 Heger
(Continued)

FOREIGN PATENT DOCUMENTS

CN          1954240 A      4/2007
DE    10 2013 221 495 A1  4/2015
(Continued)

OTHER PUBLICATIONS

International Search Report corresponding to PCT Application No. PCT/EP2018/064567, dated Aug. 21, 2018 (German and English language document) (5 pages).

*Primary Examiner* — Jermele M Hollington
*Assistant Examiner* — Suresh K Rajaputra
(74) *Attorney, Agent, or Firm* — Maginot, Moore & Beck LLP

(57) ABSTRACT

A method for locating an object hidden beneath a surface using a locating device is disclosed. At least one coupling signal dependent on the object is received by a receiving means of the locating device. Once the locating device has been placed on the surface, a first value Ci of the coupling signal is detected and the first value Ci is defined as value CBG for a background subtraction. In particular, whilst the locating device and the surface are moved relative to one another, at least one further value C of the coupling signal is detected and the value CBG for the background subtraction is re-calibrated by the at least one further value C if the at least one further value C is lower than the value CBG for the background subtraction. The re-calibration is suspended if a valid value CBG is identified for the background subtraction.

15 Claims, 4 Drawing Sheets

(56) References Cited

U.S. PATENT DOCUMENTS

2005/0242800 A1* 11/2005 Heger .................... G01V 13/00
324/67
2011/0239794 A1 10/2011 Krapf et al.

FOREIGN PATENT DOCUMENTS

EP          1 975 606 A2   10/2008
WO      2005/109040 A1   11/2005

* cited by examiner

METHOD FOR LOCATING, AND LOCATING DEVICE

This application is a 35 U.S.C. § 371 National Stage Application of PCT/EP2018/064567, filed on Jun. 4, 2018, which claims the benefit of priority to Serial No. DE 10 2017 212 094.0, filed on Jul. 14, 2017 in Germany, the disclosures of which are incorporated herein by reference in their entirety.

The disclosure relates to a method for locating a locatable object hidden under a surface to be searched using a locating device. The present disclosure further relates to a locating device configured for carrying out the method.

BACKGROUND

Methods for locating locatable objects have already been proposed, for example in DE 10 2013 221 495 A1.

Locating devices known from the prior art, in particular locating devices for finding beams in lightweight walls (known as "stud finders"), are typically based on capacitive measuring methods. A capacitance is measured here at a surface to be searched while the locating device is typically moved over the surface to be searched. If the capacitance rises above a minimum value (for example exceeding a threshold value), then a locatable object is detected and displayed by means of an output device of the locating device and output in that way to a user of the locating device. Simple locating devices of the prior art comprise a receiving means, while more complex locating devices that comprise two or more receiving means are also in use.

SUMMARY

The disclosure is based on a method for locating a locatable object hidden under a surface to be searched by means of a locating device, wherein at least one coupling signal that is dependent on the locatable object is received by a receiving means of the locating device.

"Locating device" is in particular intended to refer to a device that is provided for determining location information of a locatable object that is arranged hidden in a workpiece. The locating device here should in particular be understood to refer to a device that comprises means that are provided to detect physical and/or chemical values that indicate the presence of a locatable object, and converting them into a signal that can be electrically evaluated. The detection device in particular incorporates components, electric circuits and the like necessary for operation of the means. In one exemplary embodiment, the locating device is provided to locate locatable objects, for example a power line at which a mains voltage is present, or a wooden beam or the like, that is arranged in a wall. In one form of embodiment, the locating device is hand-held. Hand-held locating device is in particular intended to refer to the fact that the locating device can be transported without the aid of a transport machine, using only the hands, in particular with one hand. The locating device can in particular be moved, even during a measuring process, in a movement freely executed by a user of the locating device, in particular a one-dimensional or two-dimensional free movement relative to the surface to be searched, and in that way guided over the surface to be searched.

The mass of the hand-held locating device is in particular less than 5 kg, advantageously less than 3 kg, and particularly advantageously less than 1 kg. The hand-held locating device preferably comprises a housing with a handle or a handle region with which the locating device can be guided over the surface to be searched of the object to be searched.

"Provided" is particularly intended to mean specially "programmed", "designed" and/or "equipped". The fact that an object is "provided" for a specific function is in particular intended to mean that the object inter alia performs and/or executes this specific function in at least one application state and/or operating state, or that it is designed to perform the function.

A "surface to be searched" is to be understood in particular to refer to a surface of an object or workpiece that is to be searched with regard to hidden locatable objects. An object in particular represents a workpiece. The term "workpiece" in this sense means all objects or materials that can be searched by means of the locating device. For example, and not finally, the workpiece can be building materials, a wall, a floor, a ceiling, screed, an organic structure and/or parts of a site. The object or the workpiece can, for example, in particular consist of wood, glass, plastic, concrete, stone, tiles, plaster, metal, organic materials or the like. Liquids can in principle furthermore be searched.

A "receiving means" is intended to refer to a means that is provided to receive an output inductively and/or capacitively from the locatable object. In one form of embodiment of the locating device, the receiving means is designed as an electrically conductive surface. In one form of embodiment, the receiving means is designed as a flat electrode that lies in a plane which is aligned essentially parallel to the surface to be searched when the method for locating according to the disclosure is carried out. In one form of embodiment, the locating device comprises two receiving means: a first receiving means that is provided to receive a first coupling signal from the locatable object, and a second receiving means that is provided to receive a second coupling signal from the locatable object. In one alternative form of embodiment, the locating device comprises more than two receiving means, in particular four or six or eight receiving means. In an alternative form of embodiment, the locating device could also comprise significantly more receiving means, preferably present in an even number. In one form of embodiment, the locating device comprises further transmitting means and/or receiving means, as may appear appropriate to the person skilled in the art, for inductive, capacitive and/or high-frequency locating of locatable objects that carry voltage and/or are free of voltage.

In one form of embodiment, the locating device it is realized as an alternating voltage locating device and/or as a capacitive locating device. The two receiving means are in particular implemented as flat electrodes. In one form of embodiment, the receiving means, which are implemented as flat electrodes, lie in a common plane which is aligned essentially parallel to the surface to be searched when the method for locating according to the disclosure is carried out. In one form of embodiment, the two receiving means, implemented in particular as flat electrodes, define an axis.

The locating device further comprises a control device for driving the functional components of the locating device, in particular for driving and for operation of at least one input device and/or an output device, a data communication interface, a memory device, the measuring electronics, in particular of the receiving means, as well as further components as may appear appropriate to the person skilled in the art. The control device is provided for controlling the operation of the locating device, as well as for processing, in particular evaluating, received coupling signals. The control device is in particular provided for carrying out the method for locating according to the disclosure (as described below).

An energy supply device of the locating device is provided in order to supply the locating device with electrical energy for starting operation and during operation. In one form of embodiment, the energy supply device is an energy store independent of an electrical power network, for example a battery.

"Coupling signal" is intended in particular to refer to a signal that is transmitted to the locating device by means of an inductive and/or capacitive coupling from the locatable object, which is arranged in hidden manner, through the workpiece to be searched. The coupling signal is in particular a signal that can be converted into an electrical signal by means of the receiving means. The electrical signal, which represents the coupling signal in electronic form, is also referred to below as the "coupling signal". The electrical signal can, for example, be present in the form of a voltage and/or of a current, preferably in the form of a capacitance. The electrical signal, furthermore, is generated by the receiving means and output to the control device of the locating device. The term "received" is intended in particular to refer to the fact that the receiving means converts the wirelessly transmitted coupling signal (electromagnetic signal) into an electrical coupling signal, in particular one transmitted by wired means. In one form of embodiment of the locating device as a capacitive locating device, a capacitive coupling, in particular the capacitance of a respective receiving means, can be calculated. In this form of embodiment, the calculated values C of the capacitance represent the coupling signals.

A "locatable object" is in particular intended to refer to an object that is arranged, covered, in and/or behind the workpiece and locatable with the locating device. The locatable object can, for example, be formed as an alternating current cable or as a wooden beam or as a metal object or the like.

In locating devices of the prior art, a background subtraction typically takes place first after the locating device has been placed on a surface to be searched. The background (also known as the "background signal") here refers to the coupling signal that is determined in the absence of the locatable objects at the surface to be searched. The background thus corresponds essentially to the coupling signal as is caused by the surface to be searched on its own in the absence of a locatable object. A background subtraction—i.e. the subtraction of the determined background (in particular a value $C_{BG}$ of the background) from a measured coupling signal—is typically provided, since, due to the different permittivities of various materials (locatable objects, surfaces to be searched), measured coupling signals can vary markedly, such that a change in the coupling signal caused by a locatable object that is to be detected in/behind a surface to be searched is relatively small when compared to the background. This small change first becomes clear, in particular detectable, through the background subtraction.

It can, in principle, happen when a locating device is used, that the locating device, when placed on the surface to be searched, is placed directly at that position of the surface to be searched under which a locatable object to be detected is positioned (for example, accidentally placing the locating device on a beam behind a wall). As a consequence, a value $C_{BG}$ of the coupling signal that is to be subtracted for the background subtraction is determined as a particularly high value. The detection of similar locatable objects (i.e. similar material property), whose induced coupling signal does not exceed the background signal fixed in this way, is not possible.

Through the comparison of further values $C_i$ of the coupling signal determined in the course of a locating procedure with the value $C_{BG}$ of the coupling signal for the background subtraction, it is in principle possible for this circumstance to be recognized, so that a recalibration can be initiated, or the user of the locating device can be prompted to place the locating device at a different position on the surface to be searched to carry out a new ascertainment of a value $C_{BG}$ of the coupling signal for the background subtraction. Methods of this type are already known from the prior art, for example from U.S. Pat. No. 5,619,128.

The recalibration is carried out automatically, as is proposed in the prior art, so that this can lead to the disadvantage that through unintentionally lifting the locating device—for example by tilting the locating device on the surface to be set—or through moving over irregularities—for example moving over joints in a wall—a recalibration can again be initiated. As a result, however, the risk arises that a value $C_{BG}$ of the coupling signal for the background subtraction that is significantly too small is determined and applied. The sensitivity of the locating device can consequently be too high, and the locating device can tend to "over-detect". In other words, locatable objects are detected as a result of even small inhomogeneities of the surface to be searched, although in reality no locatable object is located behind or in the surface to be searched.

The method according to the disclosure is based on a method in which, in particular after placing the locating device onto the surface to be searched, a first value $C_1$ of the coupling signal is acquired, and the first value $C_1$ is set as the value $C_{BG}$ for a background subtraction, for example by equating $C_{BG}:=C_1$. Here, in particular while the locating device and the surface to be searched are moving relative to one another, at least one further value $C_i$ of the coupling signal is acquired (the index i here refers to an arbitrary further measured value of the discreetly or continuously measured coupling signal), and the value $C_{BG}$ for the background subtraction is recalibrated through the at least one further value $C_i$, for example by equating $C_{BG}:=C_i$. In one form of embodiment of the method, the value $C_{BG}$ for the background subtraction is recalibrated by the at least one further value $C_i$ if the at least one further value $C_i$ is less than the value $C_{BG}$ for the background subtraction. According to the disclosure, the re-calibration is suspended when a valid value $C_{BG}$ is recognized for the background subtraction.

"Moving relative to one another" refers here in particular to a travel, movement, shift, rotation, turning or any other kind of change in the position and/or the orientation of the locating device carried out in an arbitrary direction with reference to the surface to be searched. Alternatively or in addition it is of course also possible for the surface to be searched to be moved relative to the locating device—for example in the case of small, movable workpieces.

"Calibration" refers in particular to the fact that the coupling signal is adjusted or corrected with reference to an offset (offset value). In particular, the coupling signal can be subjected to an offset in such a way that an approximation, equalization or other kind of adaptation of the coupling signal takes place. In one form of embodiment the offset represents an additive value, while in an alternative exemplary embodiment the offset represents a factor.

According to the disclosure, the recalibration of the background signal is suspended when a valid value $C_{BG}$ is recognized for the background subtraction, in particular is recognized by means of the control device of the locating device. An incorrect and over-sensitive calibration of the background can be avoided in this way.

In one form of embodiment of the method, a valid value $C_{BG}$ is recognized for the background subtraction if it is detected, in particular detected by means of the control device, that a predefined time has elapsed between placing the locating device on the surface to be searched and/or switching the locating device on and/or acquiring the first value $C_1$.

A particularly simple realization of the method according to the disclosure can be given in this way. The predefined time is in particular predefined internally to the device and/or is adjustable by a user of the locating device. The use of a predefined time is in particular based on the recognition of the fact that a user has typically moved the locating device within this predefined time relative to the surface to be searched, so that a comparison of further values $C_i$ of the coupling signal determined in the course of the locating process with the value $C_{BG}$ of the coupling signal for the background subtraction already take place and a recalibration that may have been necessary could have been initiated. The predefined time can advantageously be chosen in such a way that it is adapted to a typical movement speed of the locating device relative to the surface to be searched by a user. In particular, the predefined time can be chosen in such a way that it corresponds to a typical movement duration that is required to move the locating device over a locatable object of a defined width. The width can, here, for example be chosen as at least 5 cm, preferably as at least 10 cm, particularly preferably as at least 15 cm. In one exemplary embodiment, the predefined time is at least 5 seconds. The predefined time is alternatively at least 10 seconds. Alternatively again, the predefined time is at least 15 seconds.

In one form of embodiment of the method, a valid value $C_{BG}$ for the background subtraction is recognized when it is detected that the locating device and the surface to be searched have been moved relative to one another, in particular have moved by a predefined distance relative to one another. The use of a predefined distance is in particular based on the recognition of the fact that within this predefined distance a comparison of further values of the coupling signal determined in the course of the locating process with the value $C_{BG}$ of the coupling signal for the background subtraction has already taken place and that a recalibration that may have been necessary could have been initiated. The predefined distance can in particular be selected to be greater than a typical width of a locatable object. In one form of embodiment of the method, a valid value $C_{BG}$ for the background subtraction is recognized when it is detected that the locating device and the surface to be searched have been moved relative to one another, in particular by at least 5 cm, preferably by at least 10 cm, particularly preferably by at least 15 cm.

A particularly reliable recognition of a valid value $C_{BG}$ can be realized in this way. The movement by a predefined distance can, for example, be detected by means of a position sensor of the locating device. The position sensor here serves for the acquisition of position data of the locating device with reference to the surface to be searched. A position sensor is in particular to be understood to refer to a sensor that is provided to convert a field change, a transit time change and/or a phase relationship into a signal that can be evaluated electrically, and to output or transmit a present position of the position sensor on the surface to be searched. The present position can here be acquired relative to an earlier position, or absolutely, in particular with reference to at least one fixed reference point, and output or transmitted as position data. The position data relate at least to coordinate data in at least one direction that determine the position of the position sensor on the surface to be searched. A reference point should be understood to refer to a point arranged in a fixed position relative to the surface to be searched, for example a distinctive point of the surface to be searched. It is further conceivable that the position sensor is provided for a position determination by means of an external reference, for example stationary transmitters and/or satellites. Alternatively it is further conceivable that the position sensor is provided to acquire position data for a locating process purely relatively, independently of a reference point on the surface to be searched. The position sensor can, for example, be designed as an optical or mechanical displacement sensor which, when in an operating state, acquires a movement of the locating device on the surface to be searched. In one form of embodiment, the position sensor is realized as an optical path transducer. The optical path transducer is in particular arranged in the side of the housing of the locating device which, when the locating device is in use, faces towards the surface to be searched. In an alternative or additional form of embodiment of the position sensor, it can be realized in the form of wheels whose rotation is acquired, and a distance covered can be determined therefrom (by means of odometry).

In one form of embodiment of the method, a valid value $C_{BG}$ for the background subtraction is recognized when it is detected that a difference between a determined maximum value $C_{max}$ of the coupling signal and a determined minimum value $C_{min}$ of the coupling signal is greater than a threshold value $C_s$ ($C_{max}-C_{min}>C_s$). In one form of embodiment of the method, the maximum value $C_{max}$ of the coupling signal can be determined over a predefined duration or over a predefined number of sampled values. Alternatively or in addition, in one form of embodiment of the method, the minimum value $C_{min}$ of the coupling signal can be determined over a predefined duration or over a predefined number of sampled values. The number and/or the durations can in particular be identical. The values $C_{max}$ and $C_{min}$ can in particular be determined after switching on or after placing the locating device on a surface to be searched. It is in this way particularly easy to ensure that the locating device is actually moved relative to the surface to be searched, so that a comparison of further values $C_i$ of the coupling signal determined in the course of the locating process with the value $C_{BG}$ of the coupling signal for the background subtraction has already taken place and that a recalibration that may have been necessary could have been initiated. The threshold value $C_s$ can, for example, be defined by 100 fF or 80 fF or 60 fF.

In one form of embodiment of the method, a valid value $C_{BG}$ for the background subtraction is recognized when it is detected that a difference between a maximum value $C_{max}$ of the coupling signal, especially one determined over a predefined duration or over a predefined number of sampled values, and the value $C_{BG}$ for the background subtraction is greater than a threshold value $C_s$ ($C_{max}-C_{BG}>C_s$). It is in this way particularly easy to ensure that the locating device is actually moved relative to the surface to be searched, so that a comparison of further values $C_i$ of the coupling signal determined in the course of the locating process with the value $C_{BG}$ of the coupling signal for the background subtraction has already taken place and that a recalibration could have been initiated. It is further possible to ensure in this way that the value $C_{BG}$ of the coupling signal used for determination of the background does not correspond to a maximum value such as is typically present when a locatable object is detected. In one form of embodiment, the threshold value $C_s$ is equal to a threshold value for the recognition of a locatable object. It is possible in this way to ensure that the background subtraction is chosen such that a locatable object can indeed be detected. The threshold value $C_s$ can, for example, be defined by 100 fF or 80 fF or 60 fF.

In one form of embodiment of the method, a valid value $C_{BG}$ for the background subtraction is recognized when it is detected that the at least one further value $C_i$ of the coupling signal is greater by a predefined value than the value $C_{BG}$ for the background subtraction. The predefined value can here in particular represent a factor or a threshold value. In this way it is possible to ensure that the locating device is moved toward a locatable object.

In one form of embodiment of the method, information is output by means of an output device of the locating device when a valid value $C_{BG}$ for the background subtraction is recognized, and a further value $C_i$ of the coupling signal is less than the value $C_{BG}$ for the background subtraction, in particular by at least 0.15%, preferably by 0.3%, particularly preferably by 0.5% less than the value $C_{BG}$ for the background subtraction. In this way, an unexpected change, in particular an unexpected drop, of the coupling signal—for example as a consequence of tilting the locating device on the surface to be searched or as a consequence of moving over irregularities in the surface to be searched—can be output as a prompt to a user of the locating device. The user-friendliness of the locating device can advantageously be increased, since an immediate feedback regarding the quality of the measurement carried out can be given by means of the locating device to the user of the locating device.

In one form of embodiment of the method, the coupling signal is modelled over a predefined duration or over a predefined number of values, in particular interpolated and/or extrapolated and/or filtered and/or averaged, for the determination of a value $C_i$ of the coupling signal. It is possible in this way to ensure that a particularly precise determination of a current value $C_i$ of the coupling signal is possible. Variations of the coupling signal, in particular outliers and measurement errors, can furthermore advantageously be left out of consideration in a modeling, in particular in an interpolation and/or extrapolation, and the method can be thus improved with respect to precision.

In one form of embodiment of the method, the method is carried out repeatedly, in particular continuously.

It is to be noted finally that the method according to the disclosure also comprises a form of embodiment of a locating device with two or more receiving means. The method can here be transferred directly to the coupling signals of the further receiving means.

The disclosure further relates to a locating device for locating a locatable object hidden under a surface to be searched, at least comprising a receiving means, which is provided to receive a coupling signal from the locatable object, and a control device, which is provided in order to carry out the method for locating according to the disclosure.

It is further to be noted that the determination of a maximum (for example $C_{max}$) or of a minimum or the like is not intended to imply a restriction to an exact value—alternatively it is also for example possible for a second-largest value or a mean value taken over, for example, the three highest (lowest) values or the like to be used. The teaching on which the disclosure is based is not changed thereby.

BRIEF DESCRIPTION OF THE DRAWINGS

The disclosure is explained in the following description in more detail with reference to the exemplary embodiments illustrated in the drawings. The drawings and the description contain numerous features in combination. The person skilled in the art will expediently also consider the features individually and combine them to form useful further combinations. The same reference signs in the figures identify the same elements.

Here.

DETAILED DESCRIPTION

Figure 1:
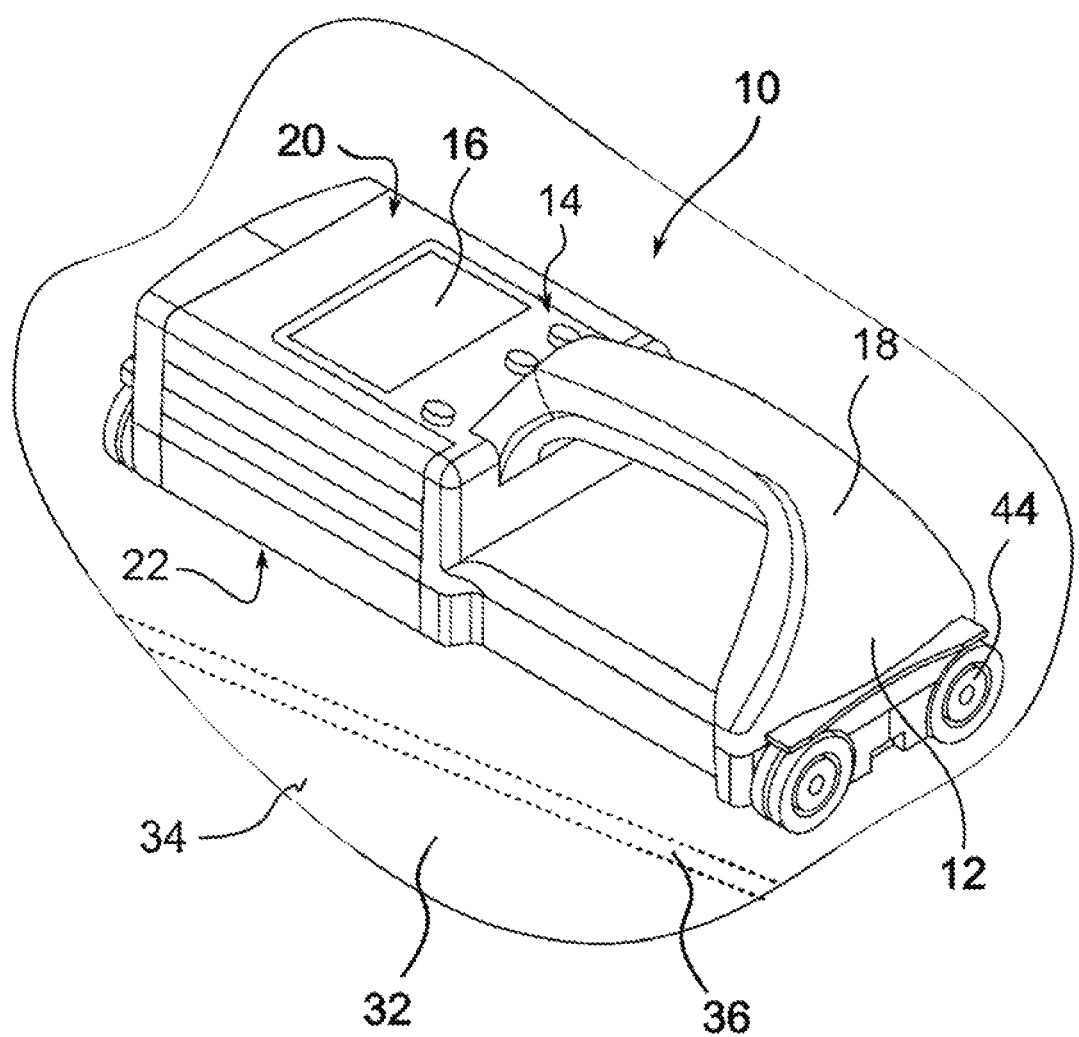
FIG. 1 shows a perspective view of a locating device according to the disclosure, placed on a surface to be searched.
Figure 2:
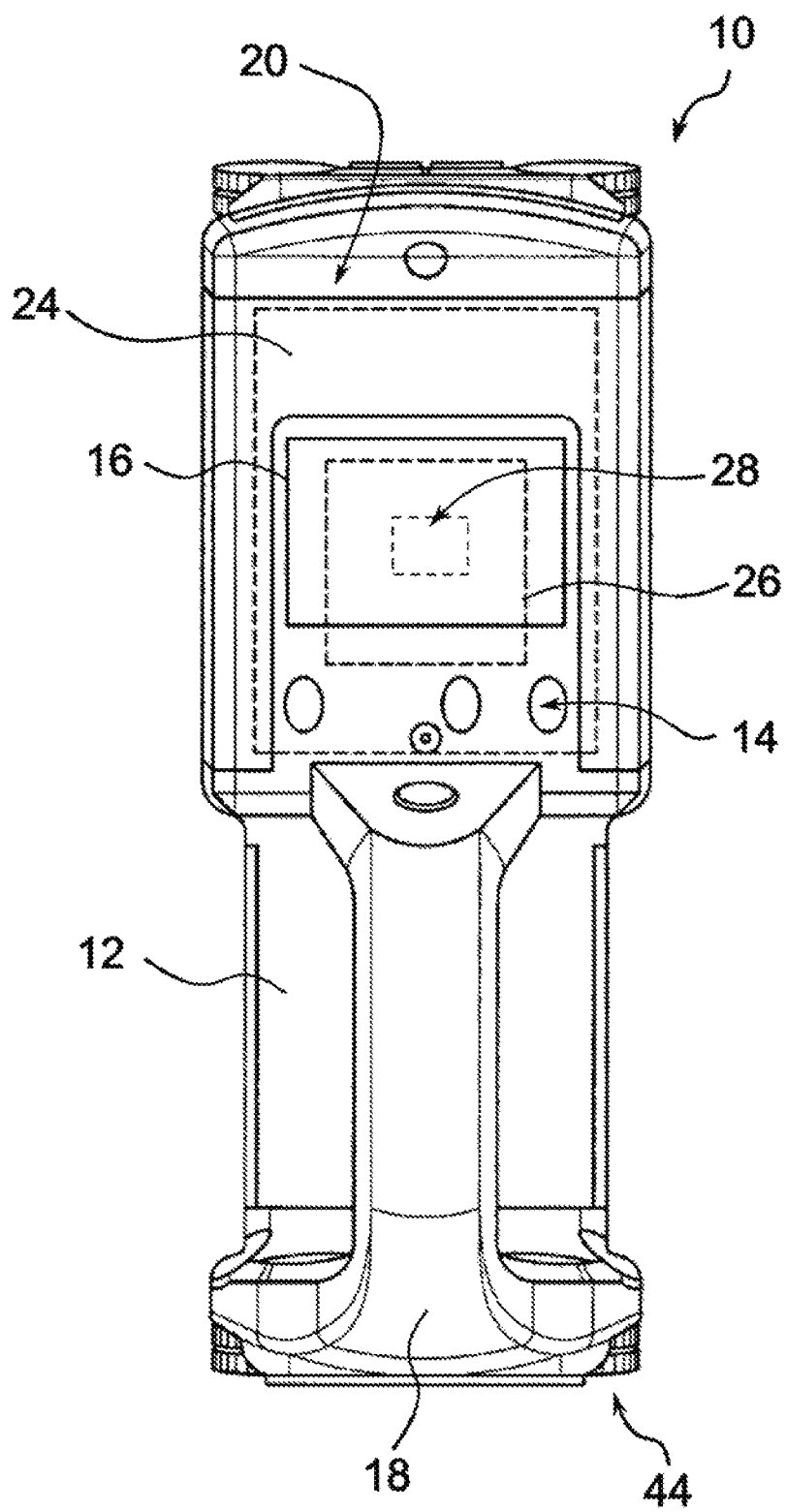
FIG. 2 shows a schematic plan view of an implementation of the locating device according to the disclosure including components internal to the device.

FIG. 1 and FIG. 2 show a perspective view and a plan view of an exemplary embodiment of the locating device 10 according to the disclosure. The locating device 10 described by way of example comprises a housing 12, an input device in the form of actuation elements 14 suitable for switching the locating device 10 on and off, for starting and configuring a measuring process and for the input of working parameters, as well as an output device 16 in the form of a screen for the output of working parameters and/or evaluation results. The locating device 10 has a handle 18 for its transport and guidance. The handle 18, the actuation elements 14 and the screen are located on a first housing side 20 of the locating device 10 which, when the locating device 10 is being used, typically faces the user.

Further components of the locating device, in particular a receiving means 28 and a control device 26, in particular for evaluating coupling signals acquired by the receiving means 28, are housed on a carrier element 24 (cf. FIG. 2), in particular a system board or circuit board inside the housing 12. The components of the locating device 10 are connected together for signaling purposes. The control device 26 comprises control electronics comprising means for communication with the other components of the locating device 10. The control device 26 comprises in particular a unit with a processing unit, a memory unit and an operating program stored in the memory unit. The control device 26 further comprises the method according to the disclosure in its memory, and is configured for carrying out said method.

For the measurement of a coupling signal, in particular for the detection of a locatable object 36 hidden under a surface to be searched 34 of a workpiece 32, the locating device 10 is positioned with its second housing side 22, i.e. the rear of the device, flat in the immediate vicinity of the workpiece 32, in particular in contact with its surface to be searched 34. Coupling signals (not illustrated in detail here), in particular capacitive coupling signals, here penetrate from the locatable object 36 through the second housing side 22 to the receiving means 28. A coupling signal received by means of the receiving means 28 is forwarded, in particular forwarded in the form of a voltage and/or a current, to the control device 26, by which it is evaluated by means of evaluation routines and processed and forwarded to an output device 16. The evaluated measurement result, in particular a detection of a locatable object 36, is displayed on the screen to the user and/or can be transmitted to a further data processing device via a data communication interface of the locating device 10.

The locating device further comprises wheels 44 which serve to acquire a movement of the locating device 10 relative to the surface to be searched 34. The wheels 44 are connected inside the device to a sensor which determines a distance covered by the locating device 10 with reference to the surface to be searched 34 from a rotation of the wheels 44.

Figure 3:
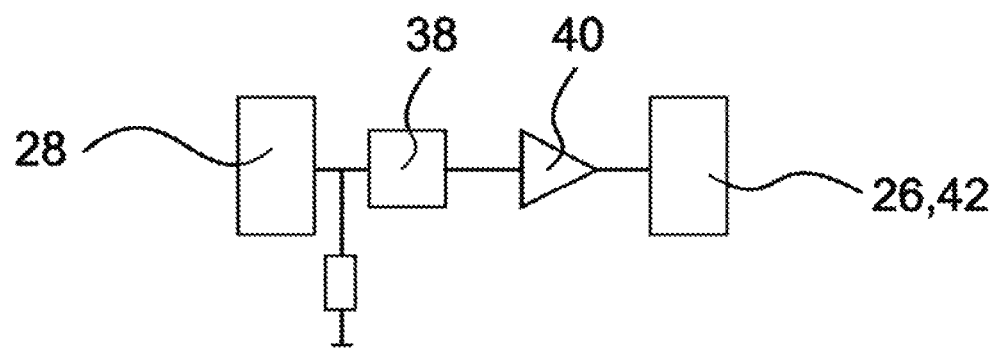
FIG. 3 shows a block diagram of exemplary measuring electronics of a locating device according to the disclosure.

FIG. 3 shows a block diagram of an exemplary implementation of measuring electronics of a locating device 10 as is illustrated in FIG. 1. A receiving means 28 is connected via a bandpass filter 38 and a subsequent impedance converter 40, including amplifier stage, to the control device 26. The control device 26 comprises in particular a microcontroller 42 with an analog-digital converter (ADC). Output signals corresponding here to capacitive coupling signals from the locatable object 36 converted into electrical coupling signals—are output by the receiving means 28. Amplitude values, in particular values $C_i$ of capacitances, are then determined in the microcontroller 42 from these coupling signals. The measuring electronics illustrated particularly represent measuring electronics of a passive locating device 10 for locating voltage-carrying lines hidden under the surface to be searched 34, wherein the locating device 10 does not itself emit a locating signal.

In an alternative exemplary embodiment, the measuring electronics can also serve for the generation of a locating signal which is emitted into a workpiece 32, reflected by a locatable object 36 and is also received and evaluated by the measuring electronics. The measuring electronics in particular represent measuring electronics of an active locating device 10 which, for example, serve for the inductive location of metallic locatable objects 36.

Figure 4:
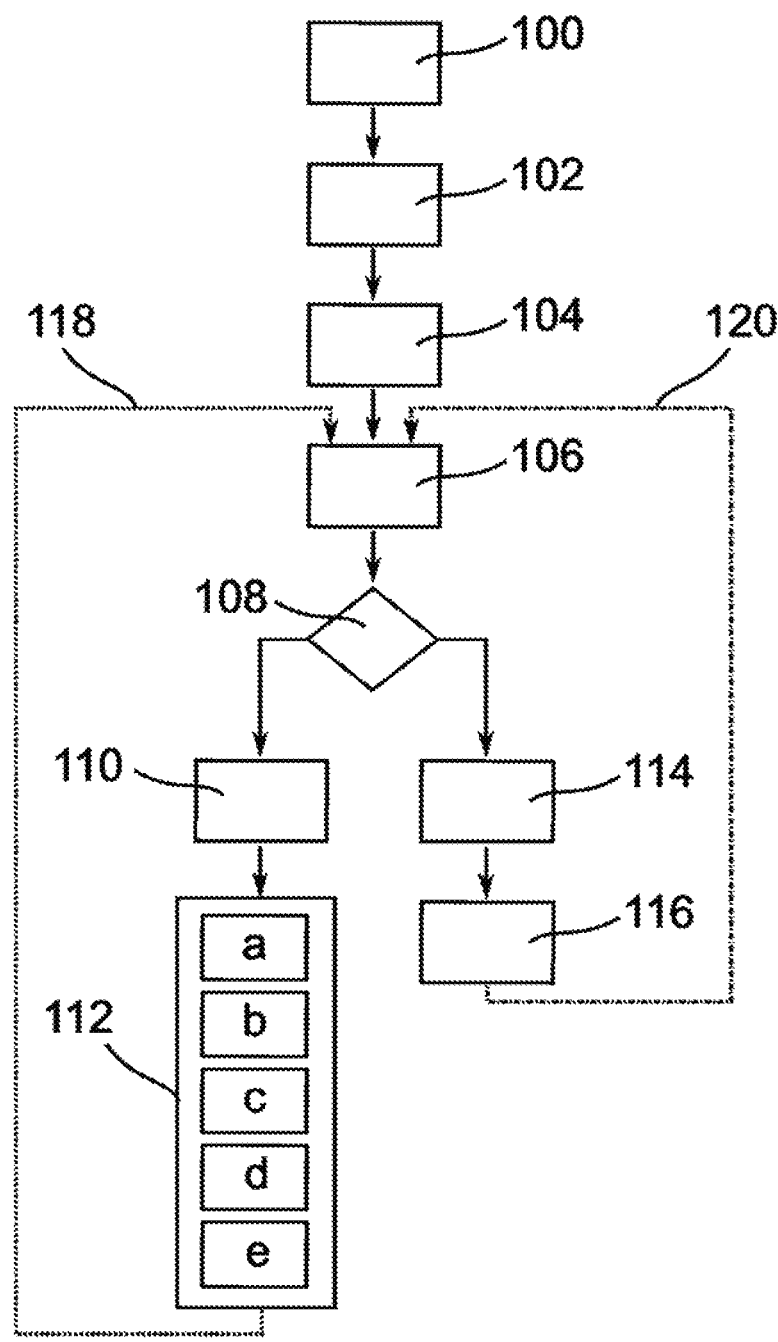
FIG. 4 shows a flow diagram of a form of embodiment of the method according to the disclosure.

FIG. 4 shows a method diagram of a form of embodiment of the method according to the disclosure for locating a locatable object 36 hidden under the surface to be searched 34 by means of a locating device 10.

In method step 100 here the locating device 10 is placed on a surface to be searched 34 of a workpiece 32. In method step 102, a coupling signal, here in particular a capacitive coupling signal between the workpiece 32 and the receiving means 28, is acquired using the receiving means 28, and a first value $C_1$ is determined from this. This value $C_1$ is set in method step 104 as the value $C_{BG}$ for the background subtraction of the locating device 10. From this point on all the coupling signals acquired are reduced by this value $C_{BG}$. In method step 106 at least one further value $C_i$ of the coupling signal is determined, in particular while the locating device 10 is moved by a user relative to the surface to be searched 34. If this further value $C_i$ is less than the value $C_{BG}$ set in method step 104 for the background subtraction (for example less by a threshold value or a threshold factor), the value $C_{BG}$ for the background subtraction is recalibrated through the at least one further value $C_i$ in method step 110, i.e. is set again, until a recalibration is suspended in accordance with the method. Whether a suspension of the recalibration has taken place is checked in method step 108.

Criteria that serve for the recognition of a valid value $C_{BG}$ for the background subtraction are checked in method step 112. The criteria are implemented as 5 independent conditions a to e:

a. it is detected, by means of the control device 26, that a predefined time has elapsed since placing the locating device 10 on the surface to be searched 34, or since switching the locating device 10 on, or since acquiring the first value $C_1$; the predefined time is, for example, 5 seconds (in an alternative exemplary embodiment, the measurement of a predefined time is not initiated until at least one of the other conditions b to e has been satisfied);

b. using the wheels 44, and by means of the control device 26, it is detected that the locating device 10 and the surface to be searched 34 have been moved relative to one another, in particular have been moved by at least 10 cm relative to one another;

c. by means of the control device 26, it is detected that a difference between a determined maximum value $C_{max}$ of the coupling signal and a determined minimum value $C_{min}$ of the coupling signal is greater than a threshold value $C_s$; $C_s$ is, for example, 80 fF (femtofarads);

d. by means of the control device 26, it is detected that a difference between a determined maximum value $C_{max}$ of the coupling signal and the value $C_{BG}$ for the background subtraction is greater than a threshold value $C_s$, wherein the threshold value $C_s$ is equal to a threshold value for the recognition of a locatable object; $C_s$ is, for example, 80 fF (femtofarads);

e. it is detected by means of the control device 26 that the value $C_i$ of the coupling signal is greater by a predefined value than the value $C_{BG}$ for the background subtraction.

If none of the criteria a to e are satisfied, then the method starts again at method step 106—represented by the repeating loop 118 (dotted line)—and repeats the method steps 106, 108, 110 and 112. If at least one criterion a to e is satisfied, then the repeated loop 118 suspends the recalibration, so that at a repeated pass of the method from method step 106 a further repeated loop 120 is entered in which the method steps 106, 108, 114 and 116 run again.

In method step 114 information, in particular a warning, is output by means of an output device 16 of the locating device 10 when a valid value $C_{BG}$ for the background subtraction is recognized in method step 108, and a further value $C_i$ of the coupling signal is less than the value $C_{BG}$ for the background subtraction, in particular at least 0.3% less than the value $C_{BG}$ for the background subtraction. Further, in method step 116, information is output when a locatable object 36 is detected.

The method steps 106, 108, 114 and 116 (also of course depending on the user moving the locating device 10 in method step 106) are repeated and in particular carried out continuously or at least quasi-continuously. The repetition of these method steps is suggested by the repetition loop 120 (dot-dash line).

It should also be mentioned that in an alternative exemplary embodiment of the method a different combination of the criteria can be implemented, for example based on the criteria a, c, d and e (if, for example, the locating device does not comprise a position sensor).

The invention claimed is:

1. A method for locating a locatable object hidden under a surface to be searched using a locating device, the method comprising:
   receiving, with a receiving device of the locating device, at least one coupling signal that is dependent on the locatable object;
   acquiring a first value of the at least one coupling signal;
   specifying the first value as a background subtraction value;
   acquiring at least one second value of the at least one coupling signal;
   recalibrating the background subtraction value with the at least one second value in response to the at least one second value being less than the background subtraction value; and suspending the recalibrating in response to recognizing a valid background subtraction value.

2. The method as claimed in claim 1, further comprising:
recognizing the valid background subtraction value in response to detecting that a predefined time has elapsed since at least one of (i) placing the locating device on the surface to be searched, (ii) switching on the locating device, and (iii) acquiring the first value.

3. A method for locating a locatable object hidden under a surface to be searched using a locating device, the method comprising:
receiving, with a receiving device of the locating device, at least one coupling signal that is dependent on the locatable object;
acquiring a first value of the at least one coupling signal;
specifying the first value as a background subtraction value;
acquiring at least one second value of the at least one coupling signal;
recalibrating the background subtraction value with the at least one second value in response to at least one second value being less than the background subtraction value;
recognizing a valid background subtraction value in response to detecting that the locating device and the surface to be searched have been moved relative to one another by at least a predefined distance; and
suspending the recalibrating in response to recognizing the valid background subtraction value.

4. The method as claimed in claim 1, further comprising:
recognizing the valid background subtraction value in response to detecting that a difference between a determined maximum value of the at least one coupling signal and a determined minimum value of the at least one coupling signal is greater than a first threshold value.

5. The method as claimed in claim 1, further comprising:
recognizing the valid background subtraction value in response to detecting that a difference between a determined maximum value of the at least one coupling signal and the background subtraction value is greater than a first threshold value.

6. The method as claimed in claim 4, wherein the first threshold value is equal to a second threshold value for recognition of the locatable object.

7. The method as claimed in claim 1, further comprising:
recognizing the valid background subtraction value in response to detecting that the at least one second value of the at least one coupling signal is greater than the background subtraction value by a predefined value.

8. The method as claimed in claim 1, further comprising:
outputting, with an output device of the locating device, information in response to (i) a valid background subtraction value being recognized, and (ii) the at least one second value of the at least one coupling signal being less than the background subtraction value by at least a predefined percentage.

9. A locating device for locating a locatable object hidden under a surface to be searched, the locating device comprising:
a receiving device configured to receive a coupling signal from the locatable object; and
a control device configured to:
acquire a first value of the coupling signal;
specify the first value as a background subtraction value;
acquire at least one second value of the coupling signal;
recalibrate the background subtraction value with the at least one second value in response to the at least one second value being less than the background subtraction value; and
suspend the recalibration in response to recognizing a valid background subtraction value.

10. The method as claimed in claim 3, wherein the predefined distance is 10 cm.

11. The method as claimed in claim 3, wherein the predefined distance is 15 cm.

12. The method as claimed in claim 3, wherein the predefined distance is 20 cm.

13. The method as claimed in claim 8, wherein the predefined percentage is 0.15%.

14. The method as claimed in claim 8, wherein the predefined percentage is 0.3%.

15. The method as claimed in claim 8, wherein the predefined percentage is 0.5%.

* * * * *